United States Patent
Merritt

(10) Patent No.: US 7,261,756 B2
(45) Date of Patent: Aug. 28, 2007

(54) SAFETY FILTER ELEMENT

(75) Inventor: Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 282 days.

(21) Appl. No.: 10/979,952

(22) Filed: Nov. 2, 2004

(65) Prior Publication Data

US 2006/0090432 A1  May 4, 2006

(51) Int. Cl.
*B01D 46/00* (2006.01)

(52) U.S. Cl. .............................. 55/482; 55/502; 55/510

(58) Field of Classification Search ................... 55/482, 55/490, 491, 492, 495, 498–502, 504, 510, 55/511; 95/273, 286, 287
See application file for complete search history.

(56) References Cited

U.S. PATENT DOCUMENTS

| | | | |
|---|---|---|---|
| 5,879,423 A * | 3/1999 | Luka et al. ................... 55/482 |
| 6,045,598 A * | 4/2000 | Fath et al. ..................... 55/490 |
| 6,179,890 B1 * | 1/2001 | Ramos et al. .................. 55/482 |
| 6,221,122 B1 * | 4/2001 | Gieseke et al. ................ 55/500 |
| 6,610,116 B1 * | 8/2003 | Avery .......................... 55/385.1 |
| 6,802,879 B2 * | 10/2004 | Scanlon ....................... 55/367 |

FOREIGN PATENT DOCUMENTS

DE  42 20 560 C1  9/1993

* cited by examiner

*Primary Examiner*—Duane Smith
*Assistant Examiner*—Robert Clemente
(74) *Attorney, Agent, or Firm*—Reinhart Boerner Van Deuren P.C.

(57) ABSTRACT

A filter element for filtering fluids and gasses flowing through a filter housing is provided. The filter element includes a permeable filter media for filtration of contaminants and a rigid frame for supporting and retaining the filter media. To ensure that gasses and fluids flow through the filter media rather than around the filter element, a resilient seal element is attached along an outer peripheral surface of the frame. The seal element can be resiliently compressed between the inner surface of the filter housing and the outer peripheral surface to create a sealing effect therebetween. To prevent the filter media from interfering with the seal element, the filter media is substantially constrained within the outer peripheral surface of the frame.

14 Claims, 7 Drawing Sheets

SAFETY FILTER ELEMENT

FIELD OF THE INVENTION

This invention pertains generally to fluid and gas filtration and more particularly to filter elements for filtering such fluids and gasses that can be received within filter housings through which those fluids and gasses flow.

BACKGROUND OF THE INVENTION

Filtration devices and systems are employed in a wide range of applications for filtering contaminants from various process fluids. For example, it is known to pass air or similar gasses through filter assemblies that enclose filtration media such as filter paper to remove dust and other contaminants. The filtration media is typically enclosed within a housing that is permanently fixated within a larger overall process system that utilizes the filtered air or gas. The filter media is often configured into a filter element or filter cartridge that can be removably received within the housing to remove the containments from the fluids or gasses flowing therein. Because of the potential for a single or primary filter element to be displaced or fail, and to prevent dislodged debris during installation or removal of the primary filter from entering the engine, it is known to provide a second or safety filter element typically downstream of the primary filter element.

One method of constructing such safety filter elements, as taught in U.S. Pat. No. 6,221,122 to Gieseke et al., herein incorporated by reference, involves a rigid support frame for supporting and retaining a planar sheet of flexible filter media. The planar sheet includes a skirt that is folded between the peripheral edge of the frame and an inner surface of the filter housing for creating a sealing effect therebetween and ensuring that process fluids and gasses flow through the safety filter element. The skirt when folded during slidable insertion of the filter element into the filter housing provides the potential for leak paths past the safety filter element.

BRIEF SUMMARY OF THE INVENTION

The invention provides a filter element intended for use as a secondary or safety filter element that includes a rigid frame for supporting and retaining a filter media. The filter media is permeable and capable of filtering contaminants from process gasses flowing therethrough while the rigid frame is substantially non-permeable. To ensure that the process gasses and fluids flow through the filter media, the filter element includes a resilient seal element attached to an outer peripheral surface of the frame. When the filter element is received in a filter housing, the seal element resiliently engages the inner surface of the housing to provide a sealing effect therebetween. In an aspect of the invention, to prevent the filter media from interfering with the engagement between the seal element and the inner surface, the filter media is constrained or confined within the outer peripheral surface of the frame.

An advantage of the invention is that it provides for a seal between a filter element and a filter housing. Another advantage is that the invention prevents filter media from interfering with a seal created between the filter element and the filter housing. These and other advantages and features of the invention will become apparent from the following drawings and detailed description.

BRIEF DESCRIPTION OF THE DRAWINGS

The accompanying drawings incorporated in and forming a part of the specification illustrate several aspects of the invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
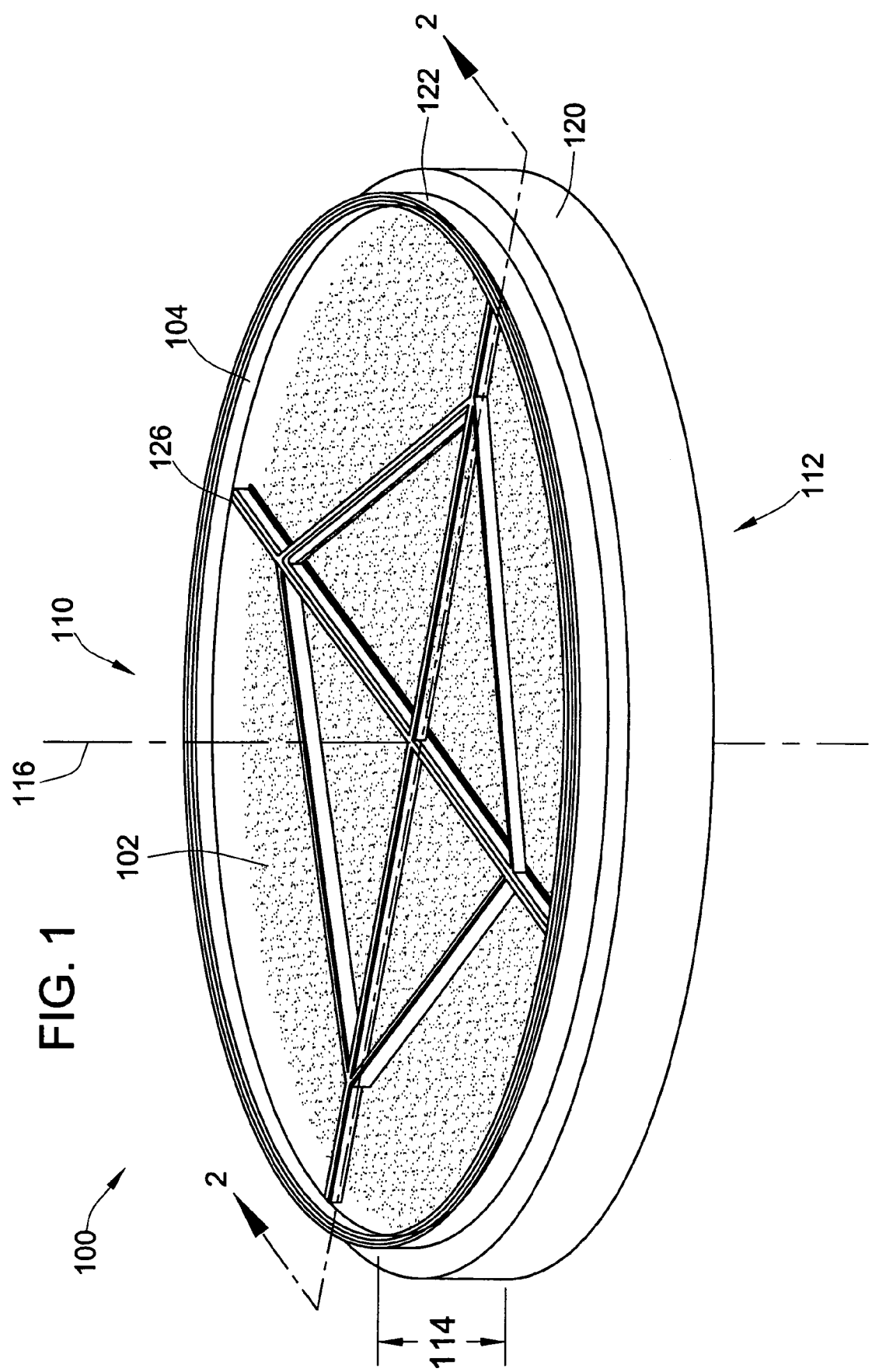
FIG. 1 is a top perspective view of a filter element designed in accordance with the teachings of the invention to include a filter media, a frame, and a seal element.
Figure 2:
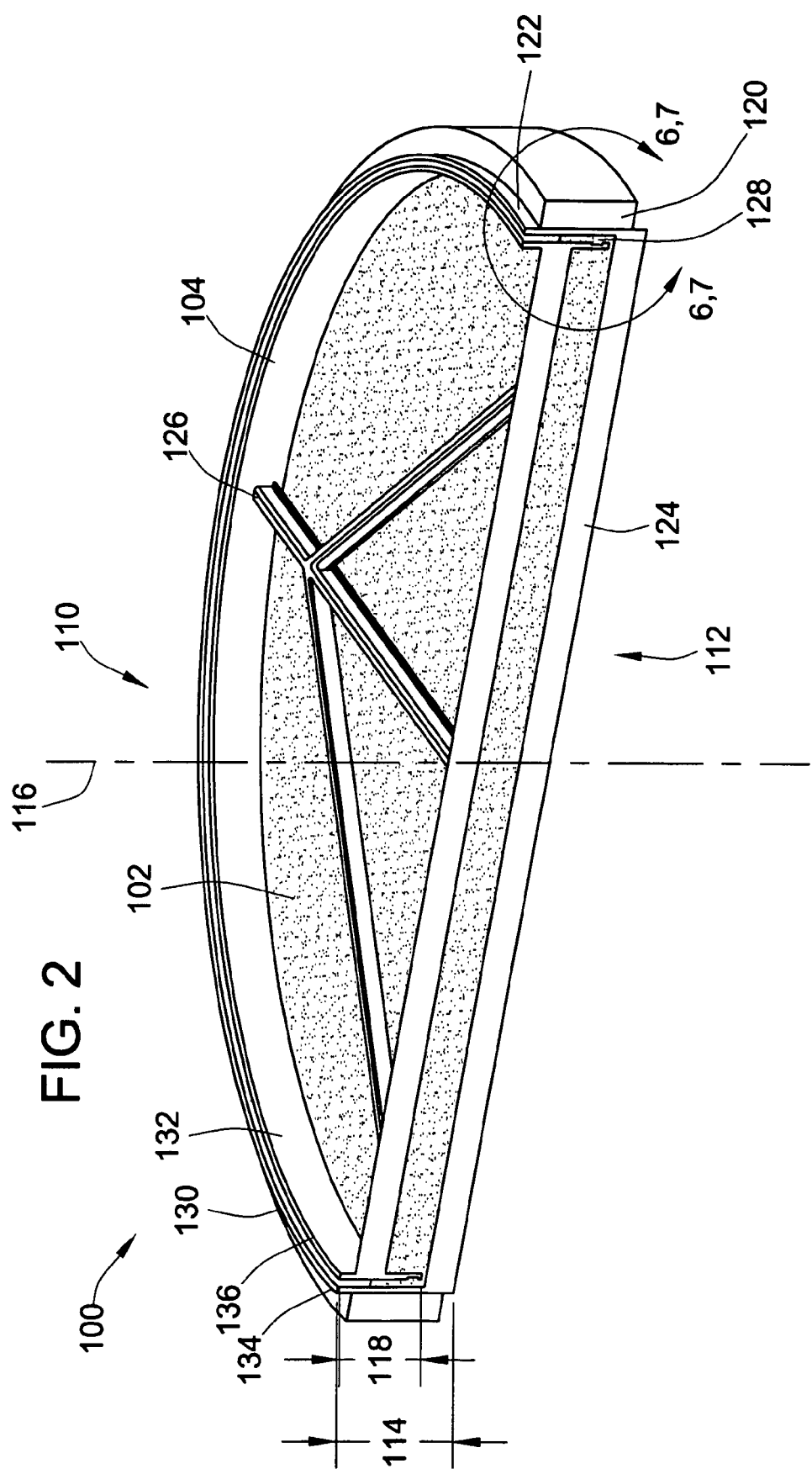
FIG. 2 is cross-sectional view taken along line 2-2 of FIG. 1.
Figure 3:
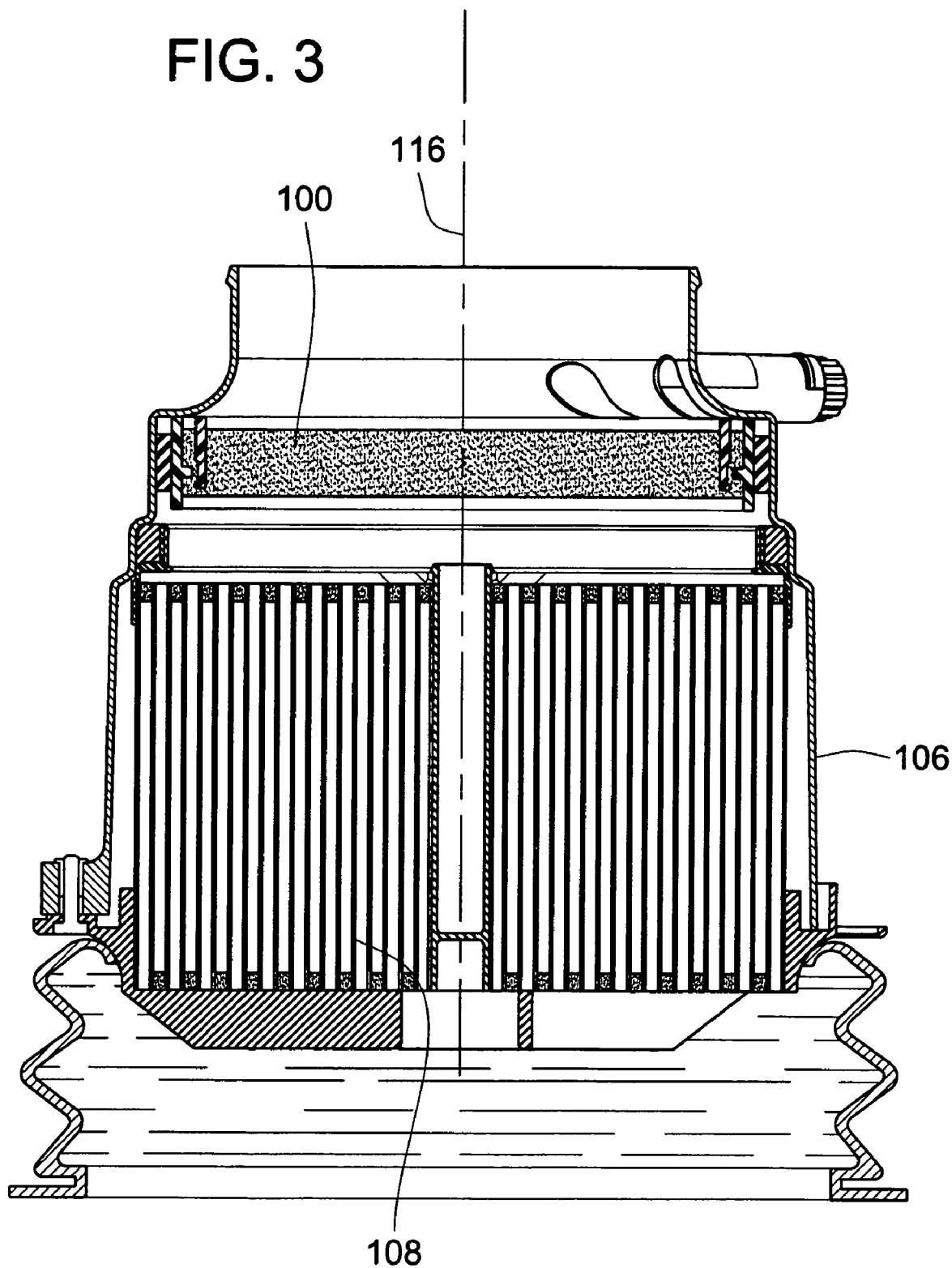
FIG. 3 is a cross-sectional view of a filter assembly including the filter element of FIG. 1 arranged as a secondary filter element with respect to a primary filter element.

Now referring to the drawings, wherein like reference numbers refer to like elements, there is illustrated in FIGS. 1 and 2 a filter element 100 through which process fluids and particularly gasses such as air may flow. The filter element 100 includes a filter media 102 for removing containments from the process gasses and a rigid frame 104 for supporting and retaining the filter media. The gas-permeable filter media 102 can be made from any suitable material including, for example, a fibrous non-woven filter material or, more preferably, polyester fiber. Likewise, the non-permeable rigid frame can be made from any suitable material including, for example, thermoplastic. As illustrated in FIG. 3, the filter element 100 is designed to be accommodated within a tubular filter housing 106 fixed within a larger overall system and preferably is to be used as a secondary or safety filter element located upstream or downstream of a primary filter element 108. The primary filter element can be constructed from a corrugated, multilayered sheet having a plurality of fluted channels.

Referring back to FIGS. 1 and 2, the filter element 100 includes a first face 110 and a spaced-apart second face 112 that define the overall height, designated as 114, of the filter element. In operation, process gasses impinge upon either the first or second faces 110, 112, flow through the filter media 102 and out the opposite face. In the illustrated embodiment, the filter element 100 including the rigid frame 104 are circular in shape and define an axis line 116 but in other embodiments could have other shapes such as oval, rectangular, etc. Accordingly, geometric references such as "annular," "ring-shaped," and the like are intended to encompass these and other shape alternatives.

To ensure that process gasses flow through the filter media 102 and not between the filter element 100 and the inner surface of the filter housing, the filter element includes a resilient seal element 120 attached to the outer peripheral surface 122 of the frame 104. The outer peripheral surface 122 is oriented to oppose the inner surface of a correspondingly shaped filter housing. In the illustrated embodiment, the resilient seal element 120 is shaped as a uniform band that extends continuously about the frame 104, though in other embodiments, the seal element can be configured in different shapes such as, for example, an O-ring. It will be appreciated that when the filter element 100 is axially inserted into the correspondingly shaped housing, the seal element 120 will be compressed between the inner surface of the housing and the outer peripheral surface 122 of the frame 104 to provide a sealing effect. Because of its uniform shape and resilient properties, the seal element 120 will compress and distort so as to avoid creating creases or folds, thereby eliminating potential leak paths.

The resilient seal element 120 can be made from any suitable resilient, compressive material, including for example urethane foam and foamed nitrile rubber. Preferably, the resilient seal element is made from foamed urethane tape having an adhesive backing. The adhesive backing on the urethane tape provides a convenient way of attaching the seal element 120 to the frame 104. In other embodiments, the resilient seal element can be attached by dimensioning the seal element to provide a compressive fit about the outer peripheral surface of the frame.

To prevent the filter media 102 from interfering with the seal created between the seal element 120 and the inner surface of the filter housing, the filter media is preferably constrained or confined within the frame 104. Referring to FIG. 2, to prevent displacement of the retained filter media 102 with respect to the frame 104 during operation, the frame includes various support ribs 124, 126 that extend across the first and second faces 110, 112 and thereby sandwich the filter media. Furthermore, the outermost portion or edge 128 of the filter media 102 is circumscribed and confined within the outer peripheral surface 122 of the frame 104. Accordingly, even when a flexible filter media is utilized in the filter element, the frame restrains the filter media from shifting or repositioning itself between the seal element and filter housing. In addition to constraining the filter media 102, the frame 104 also positions and supports the seal element 120 against the inner surface of the filter housing.

Figure 4:
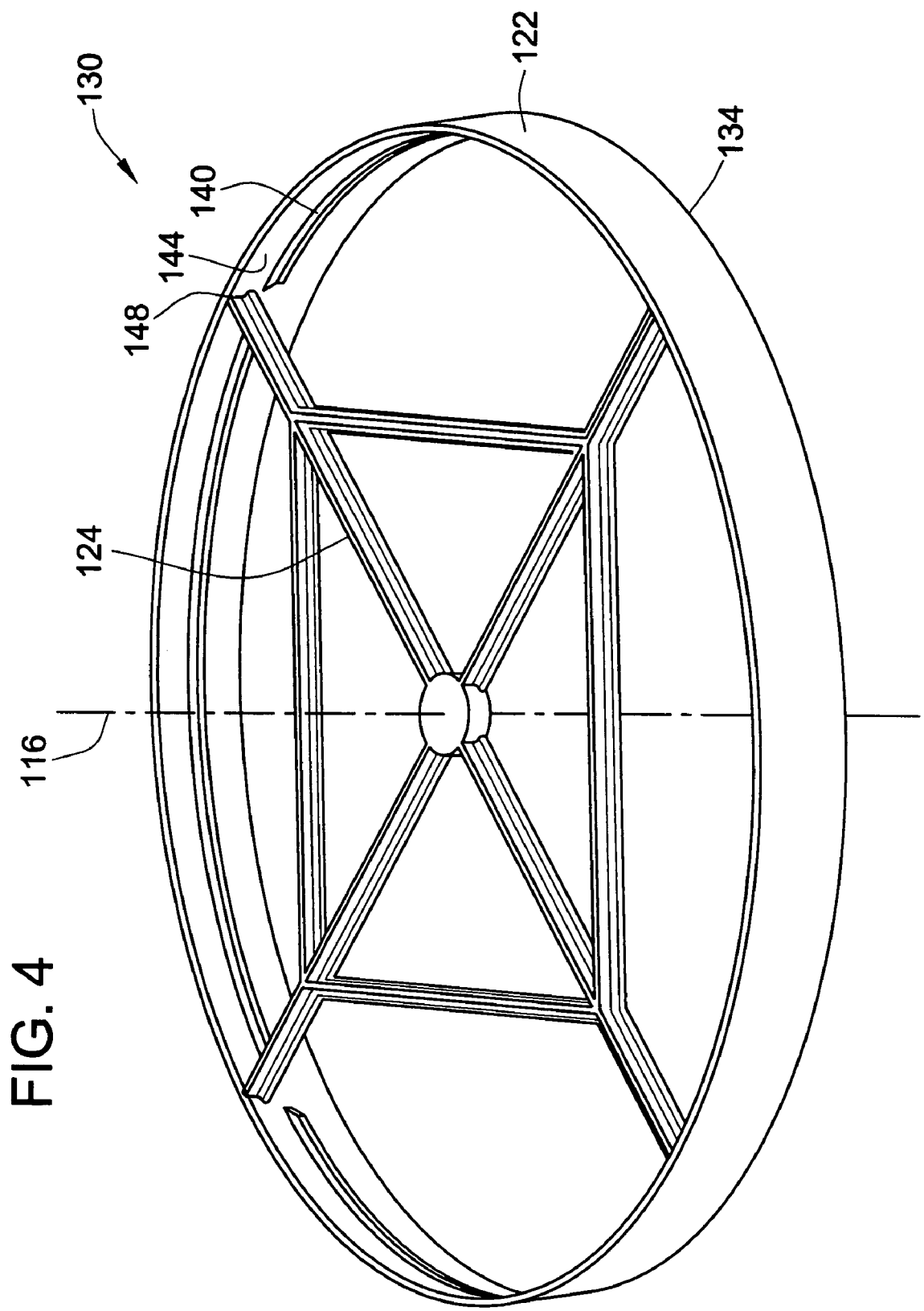
FIG. 4 is a bottom perspective view of the outer ring component of the frame.
Figure 5:
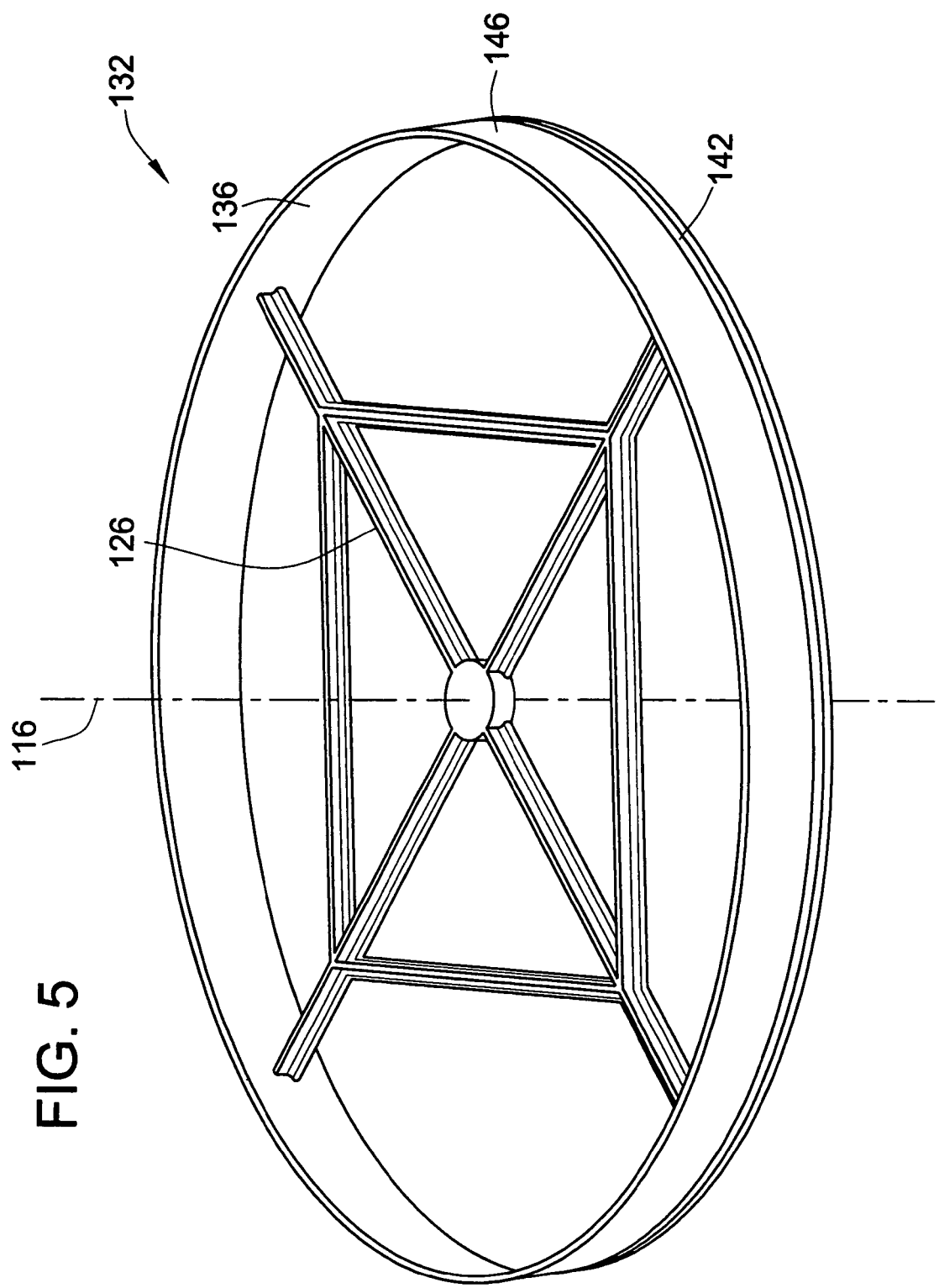
FIG. 5 is a top perspective view of the inner ring component of the frame.

The rigid frame 104 to which the seal element 120 is attached is a two part structure including an outer ring 130 and an inner ring 132, both having an annular shape. In the illustrated embodiment in FIGS. 4 and 5, both the outer and inner ring 130, 132 are circular and extend about the axis line 116 with the inner ring having a smaller diameter and situated inside of the outer ring. Referring to FIG. 4, the outer ring 130 has a generally thin, annular wall 134 that extends continuously about and is arranged parallel to the axis line 116. The first plurality of support ribs 124 are joined to and extend across the annular wall 134 to provide a lattice structure that prevents displacement of the filter media. Referring to FIG. 5, the inner ring 132 also has a thin annular wall 136 that extends about the axis line 116 and a second plurality of support ribs 126 that extend across the annular wall. The outer and inner rings can be made from any suitable material including, for example, thermoplastic.

To engage the outer and inner rings 130, 132, the first and second annular walls 134, 136 can be formed with an interlocking shoulder and groove feature. For example, referring to FIG. 4, a shoulder 140 can protrude from the inner surface 144 of the first annular wall 134. The shoulder 140 can extend, as illustrated, intermittently along the inner surface 144 breaking to accommodate the support rib—annular wall joints 148 or, in other embodiments, can extend continuously along the inner surface. As illustrated in FIG. 5, a corresponding groove 142 is disposed into the outer surface 146 of the second annular wall 136.

Figure 6:
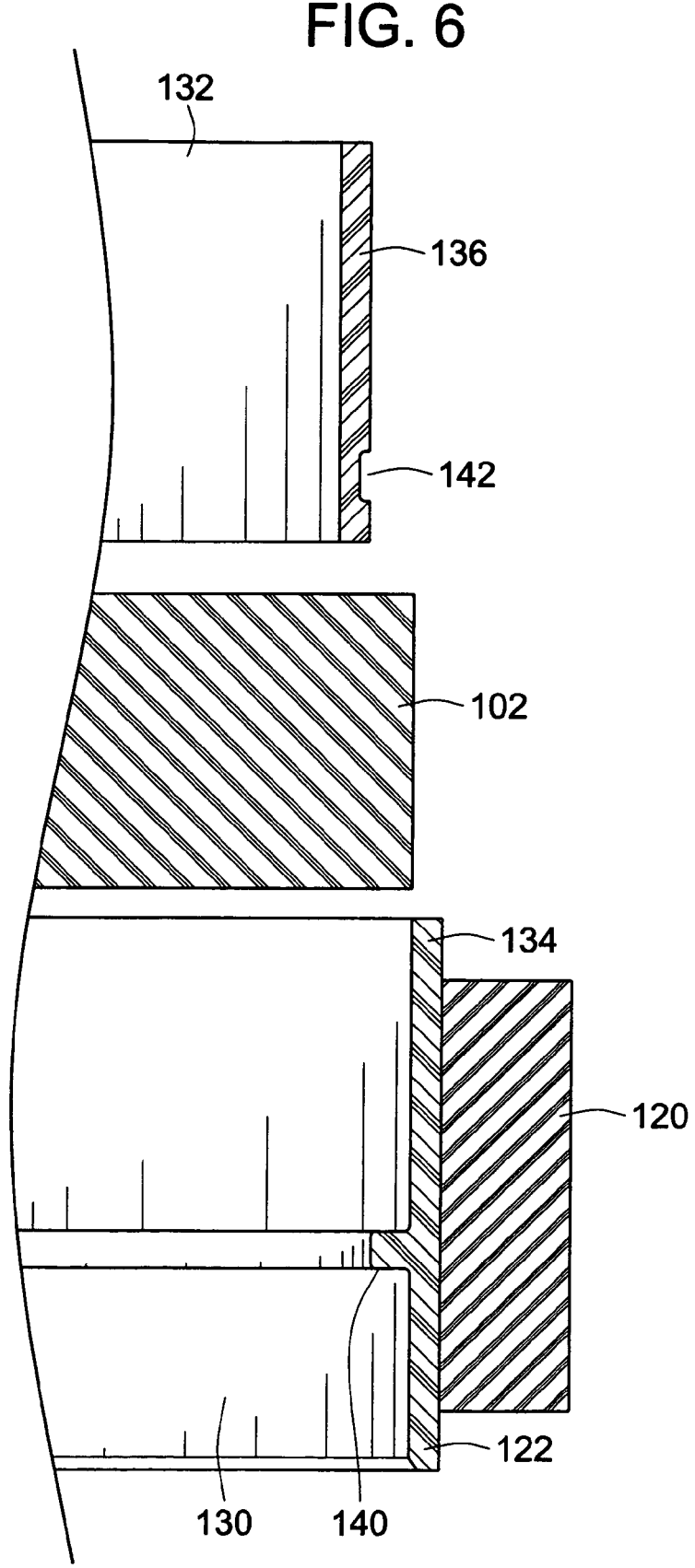
FIG. 6 is an exploded view taken of the area indicated in FIG. 2 illustrating the assembly of the outer and inner rings with the filter media.
Figure 7:
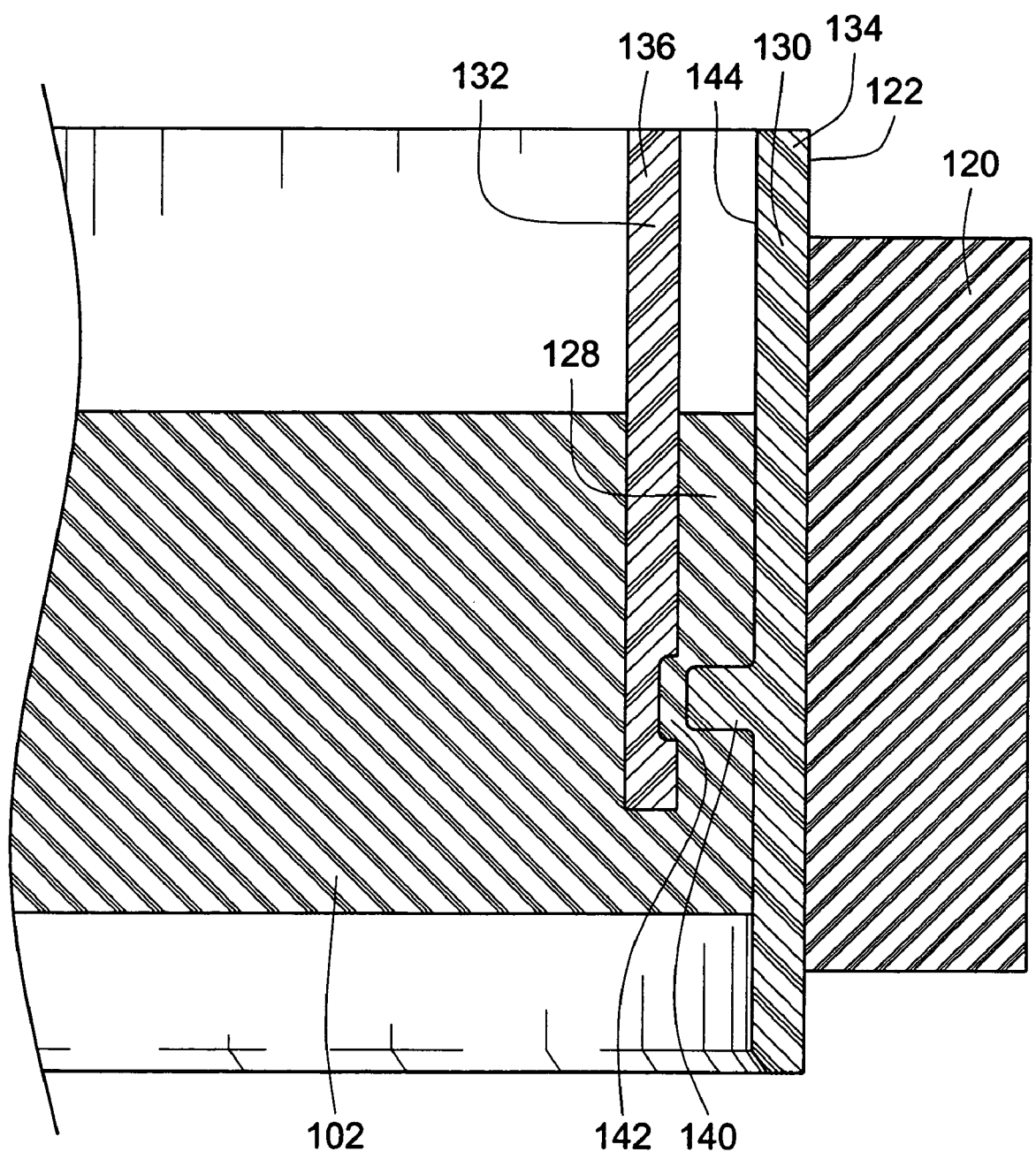
FIG. 7 is a detailed view of the area indicated in FIG. 2 illustrating the interlocking engagement of the outer and inner rings.

To assemble the filter element, referring to FIGS. 6 and 7, the inner ring 132 and filter media 102 are pressed axially into the outer ring 130 until the shoulder 140 and groove 142 align and interlock. As will be appreciated, making the outer and inner rings from thermoplastic material allows limited distortion of annular walls to facilitate assembly while still providing sufficient rigidity for the frame, especially when the outer and inner rings are interlocked. The seal element 120 can be attached to the outer peripheral surface 122 either prior to or after assembly of the outer and inner rings 130, 132.

As illustrated in FIG. 7, when the outer and inner rings are interlocked, the outermost portion 128 of the filter media 102 becomes held between the first and second annular walls 134, 136 and is pinched by the shoulder and groove 140, 142. Hence, the filter media 102 is securely retained to the frame 104. Furthermore, this outermost portion 128 of the filter media 102 abuts against and is constrained by the inner surface 144 of the first annular wall 134, thereby preventing the filter media from interfering with the seal element 120.

Referring back to FIG. 2, in the illustrated embodiment it will be appreciated that to enable the inner and outer rings 130, 132, including the support ribs 124, 126, to properly engage, the heights of the annular walls 134, 136 differ. Specifically, the height of the first annular wall 134 dimensionally corresponds to the overall height 114 of the filter element 100 as measured between the first and second faces 110, 112. The height of the second annular wall 136, designated by reference number 118, is dimensionally less than the height 114 of first annular wall 134. When assembled, the second annular wall 136 is therefore spaced-apart from the second face 112 thereby providing a clearance for the first plurality of support ribs 124 to extend across the first annular wall 134 and adjacent to the second face.

Thus, the invention provides a filter element that can be removably inserted into a correspondingly shaped filter housing. The filter element includes a filter media for removing containments and a rigid frame for retaining and supporting the filter media. To create a seal between the filter element and the inner surface of the filter housing, a resilient seal element is attached to a peripheral outer wall of the frame. When the filter element is inserted into the housing, the resilient seal element is compressed between the inner surface and peripheral wall of the rigid frame.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:

a filter frame, a filter media, and a resilient seal member, with the filter frame having an inner ring and an outer ring thereof;

the outer ring defining an axis line of the filter element, and having an annular wall thereof extending axially an outer ring height about the axis line between first and second opposite axially directed faces of the outer ring, with the outer ring height defining an overall axial length of the filter element;

the annular wall of the outer ring further defining oppositely facing inner and outer peripheral surfaces thereof, with the inner peripheral surface of the outer ring defining an outer periphery of an open area inside the outer ring;

the inner ring having an annular wall thereof extending axially an inner ring height about the axis line between first and second opposite axially directed ends of the outer ring, with the inner ring height having an overall axial length that is less than the outer ring height;

the annular wall of the inner ring further defining oppositely facing inner and outer peripheral surfaces thereof, with the inner peripheral surface of the outer ring defining an inner periphery of an open area inside the inner ring;

the inner ring being disposed within the outer ring, with the first end of the inner ring being located flush with or below the first face of the outer ring, and configured such that the inner peripheral surface of the annular wall of the outer ring and the outer annular surface of the annular wall of the inner ring cooperatively define an annular space between the inner and outer rings;

the outer ring further having support ribs adjacent the second face thereof and extending across the open area of the outer ring, the inner ring further having support ribs adjacent the first end thereof and extending across the open area of the inner ring, with the support ribs of the inner and outer rings being configured and axially spaced from one another, when the inner ring is disposed within the outer ring, to define an axial space therebetween for receiving and providing axial constraint of the filter media;

the inner and outer rings further having a complimentary juxtaposed shoulder and groove arrangement disposed within the annular space between the inner and outer rings, for clamping a portion of the filter media between the first and second rings;

the filter media being disposed in the axial space between the support ribs of the inner and outer rings and having a peripheral area of the filter media wrapped around the second end of the inner ring and extending axially into the annular space between the inner and outer rings, with the peripheral area being clamped within the annular space by the shoulder and groove arrangement in such a manner that the filter media does not extend beyond the first face of the filter element; and the resilient seal element being attached to and extending substantially completely circumferentially about the outer peripheral surface of the annular wall of the outer ring.

2. The filter element of claim 1, wherein the seal element is adhered to the outer peripheral surface of the annular wall of the outer ring.

3. The filter element of claim 2, wherein seal element comprises foamed rubber having an adhesive backing for adhering the seal element to the outer peripheral surface.

4. The filter element of claim 3, wherein the foamed rubber is foamed urethane.

5. The filter element of claim 1, wherein the shoulder protrudes from the outer ring and the groove is defined by the inner ring, with the shoulder and groove defining a clamping space therebetween for compressively clamping the filter media within the clamping space.

6. The filter element of claim 5, wherein the first and second annular walls are circular in shape.

7. The filter element of claim 1, wherein the filter media comprises a fibrous, non-woven media.

8. The filter element of claim 7, wherein the filter media comprises polyester fiber.

9. The filter element of claim 1, wherein the first and second retaining rings comprise a thermoplastic material.

10. A filter assembly comprising:

a tubular filter housing having an inlet and an outlet;

a primary filter element received in the housing; and a secondary filter element received in the housing downstream of the primary filter element;

the secondary filter element having a filter frame, a filter media, and a resilient seal member, with the filter frame having an inner ring and an outer ring thereof;

the outer ring defining an axis line of the filter element, and having an annular wall thereof extending axially an outer ring height about the axis line between first and second opposite axially directed faces of the outer ring, with the outer ring height defining an overall axial length of the filter element;

the annular wall of the outer ring further defining oppositely facing inner and outer peripheral surfaces thereof with the inner peripheral surface of the outer ring defining an outer periphery of an open flow area of the outer ring;

the inner ring having an annular wall thereof extending axially an inner ring height about the axis line between first and second opposite axially directed ends of the outer ring, with the inner ring height having an overall axial length that is less than the outer ring height;

the annular wall of the inner ring further defining oppositely facing inner and outer peripheral surfaces thereof with the inner peripheral surface of the outer ring defining an inner periphery of an open flow area of the inner ring;

the inner ring being disposed within the outer ring, with the first end of the inner ring located flush with or below the first face of the outer ring, and configured such that the inner peripheral surface of the annular wall of the outer ring and the outer annular surface of the annular wall of the inner ring cooperatively define an annular space between the inner and outer rings;

the outer ring further having support ribs adjacent the second face thereof and extending across the open flow area of the outer ring, the inner ring further having support ribs adjacent the first end thereof and extending across the open flow area of the inner ring, with the support ribs of the inner and outer rings being configured and axially spaced from one another, when the inner ring is disposed within the outer ring, to define an axial space therebetween for receiving and providing axial constraint of the filter media;

the inner and outer rings further having a complimentary juxtaposed shoulder and groove arrangement disposed within the annular space between the inner and outer rings, for radially clamping a portion of the filter media between the first and second rings;

the filter media being disposed in the axial space between the support ribs of the inner and outer rings and having a peripheral area of the filter media wrapped around the second end of the inner ring and extending axially into the annular space between the inner and outer rings, with the peripheral area being clamped within the annular space by the shoulder and groove arrangement in such a manner that the filter media does not extend beyond the first face of the filter element; and the resilient seal element being attached to and extending substantially completely circumferentially about the outer peripheral surface of the annular wall of the outer ring.

11. The filter assembly of claim 10, wherein the seal element comprises foamed rubber having an adhesive backing for adhering the seal element to the outer peripheral surface of the annular wall of the outer ring.

12. The filter assembly of claim 11, wherein the foamed rubber is foamed urethane.

13. The filter assembly of claim 10, wherein the primary filter element comprises a plurality of fluted channels.

14. The filter assembly of claim 10, wherein, the tubular filter housing further comprises a portion thereof defining an axial length substantially equal to the overall height of the secondary filter element and configured for sealingly receiving therein the secondary filter element.

* * * * *